(12) United States Patent
Adcock et al.

(10) Patent No.: US 7,024,385 B1
(45) Date of Patent: Apr. 4, 2006

(54) AUTOMATIC ELECTRONIC FUNDS TRANSFER SYSTEM AND METHOD

(75) Inventors: John Warwick Adcock, Hawthorn (AU); Rodney Alfred John Reynolds, Kew (AU)

(73) Assignee: XCELLINK Corporation, Hong Kong (CN)

( * ) Notice: Subject to any disclaimer, the term of this patent is extended or adjusted under 35 U.S.C. 154(b) by 0 days.

(21) Appl. No.: 09/254,148

(22) PCT Filed: Aug. 27, 1997

(86) PCT No.: PCT/AU97/00548

§ 371 (c)(1),
(2), (4) Date: Jun. 11, 1999

(87) PCT Pub. No.: WO98/09260

PCT Pub. Date: Mar. 5, 1998

(30) Foreign Application Priority Data

Aug. 29, 1996 (AU) .................................... PO2011

(51) Int. Cl.
*G06F 17/60* (2006.01)
(52) U.S. Cl. .............................. 705/37; 705/38; 705/39
(58) Field of Classification Search ................ 380/25; 705/40, 41, 39, 26, 35, 42, 38, 37, 24
See application file for complete search history.

(56) References Cited

U.S. PATENT DOCUMENTS

| | | | |
|---|---|---|---|
| 4,302,810 A | 11/1981 | Bouricius et al. | |
| 4,562,340 A | 12/1985 | Tateisi et al. | |
| 4,678,895 A | 7/1987 | Tateisi et al. | |
| 4,858,121 A | 8/1989 | Barber et al. | |
| 4,877,947 A | 10/1989 | Mori | |

(Continued)

FOREIGN PATENT DOCUMENTS

EP        2 188 180        9/1987

(Continued)

OTHER PUBLICATIONS

Gabriel, Frederick; "Electronic payment firm banks on unbanked clients", Crains New York Business, p12. Mar. 1996.*

*Primary Examiner*—Jagdish N Patel
(74) *Attorney, Agent, or Firm*—Barnes & Thornburg LLP (57) ABSTRACT

A method and system for automatically conducting a business transaction between a user and a trader, including the functions of ordering, financial transaction, delivery initiation and data management. A trader terminal (170) includes billing information (200) representative of the trader and a user terminal (100) or user card (800) is used to receive and process the billing information (200) over a local communications link (300). The user terminal (100) or user card (800) includes user information representative of the user. The user information and billing information is transmitted by the user terminal (100) to a service provider (500) over a communications network (400) whereupon the service provider (500) automatically transfers funds of the user, which may be reserved funds, to the trader upon entry of a PIN by the user on the user terminal (100). Delivery destination information and information identifying the goods and/or services purchased by the user may be transmitted to the service provider (500) and to an electronic warehouse (900).

58 Claims, 4 Drawing Sheets

U.S. PATENT DOCUMENTS

| | | | |
|---|---|---|---|
| 4,926,325 A | 5/1990 | Benton et al. | |
| 5,168,446 A * | 12/1992 | Wiseman | 364/408 |
| 5,485,520 A * | 1/1996 | Chaum et al. | 705/74 |
| 5,526,409 A | 6/1996 | Conrow et al. | |
| 5,724,424 A * | 3/1998 | Gifford | 380/24 |
| 5,757,917 A * | 5/1998 | Rose | 380/25 |
| 5,825,881 A * | 10/1998 | Colvin, Sr. | 705/78 |
| 5,956,391 A * | 9/1999 | Melen et al. | 379/114 |
| 6,260,024 B1 * | 7/2001 | Shkedy | 705/37 |
| 6,408,284 B1 * | 6/2002 | Hilt | 705/40 |

FOREIGN PATENT DOCUMENTS

| | | |
|---|---|---|
| EP | 527 639 A2 | 2/1993 |
| WO | WO95/04328 | 2/1995 |
| WO | WO95/20195 | 7/1995 |
| WO | WO96/04618 | 2/1996 |

* cited by examiner

FIG. 1.

AUTOMATIC ELECTRONIC FUNDS TRANSFER SYSTEM AND METHOD

BACKGROUND AND SUMMARY OF THE INVENTION

This invention relates to a system and method for automatically transferring funds from a user's account to a trader's account in a transaction that may include, but is not limited to, delivery of the goods or services purchased by the user. This invention also relates to the collection of legislated taxes and imposts and allows for reverse transfer of funds after a transaction.

DESCRIPTION OF THE PRIOR ART

Electronic Funds Transfer at Point of Sale (EFTPOS) technology is well-known where, in order to process a transaction, a user's card is read by a terminal so that funds are transferred from an account of the user to the particular trader. Smart cards are also well-known in which the card has a built in microprocessor storing a credit limit or funds of a certain value for a user, the balance of which can be remotely debited or replenished.

Other technologies such as electronic charging and billing, electronic ordering in direct sales, and electronic warehousing are also well-known. The integration of these with electronic funds transfer (EFT) has been inhibited by the absence of a uniform approach to the data that controls the functions, and the absence of convenient methods for coupling traders to users automatically.

In Australian Patent Application No. 66417/94 there is disclosed a funds transaction device incorporating a mobile telephone and keypad device. A CPU of the device stores the trader account details and reads account data from a user's credit or debit card which is swiped and read by a card reader of the device. The user then enters account type, PIN and dollar amount of the goods to be purchased via the keypad. Communication is enabled through the mobile telephone to a host EFTPOS network that is connected to the particular bank or credit establishment of the user. Both user and trader data are transmitted so that funds are transferred from the user's account to the trader's account.

Australian Patent Application No. 33658/95 discloses a portable terminal that can be used to transfer funds from a user's account to a trader's account. The terminal communicates with a host computer through a cellular and/or fixed communications network. To effect a transaction, the user either swipes a debit or credit card or inserts a smart card. After a PIN is entered by the user, the terminal prompts the user to enter a dollar amount, identify the trader and the item or service being purchased. After verification, the debit/credit account is debited through the remote host computer or in the case of a smart card being used the on-board processor debits the card. The trader is then credited by the dollar amount.

Australian Patent Application No. 73418/94 discloses a mobile telephone which incorporates a smart card reader/writer designed to receive one of a variety of different types and makes of card inserted therein so that the telephone can read from or write to the smart card. The telephone is adapted to communicate over a cellular network and via a Public Switched Telephone Network (PSTN) with a host financial institution so that payment for goods or services can be debited from the user's smart card and credited to the particular trader's account.

In all the above mentioned prior art, to effect a payment, significant data entry is required by the user and by the trader at the point of sale of the trader. After completing the particular data entries a dual accounting process takes place in which funds are transferred from a user's account into a trader's account and then a record is made of the removal of the debt. These processes involve physical actions by both trader and user which are time-consuming and prone to error regarding data entry. Furthermore, a person readable account is required, the user is needed to initiate the payment and the prior art methods are limited to processes for transferring funds.

SUMMARY OF THE INVENTION

The present invention provides for a system that automatically transfers funds from a user's account to a trader's account that requires minimum data entry and may be performed remotely. Furthermore, the automatic transfer of such funds is part of an overall system that communicates and automatically manages all the information needed for a complete business transaction cycle. The cycle includes the initiation of a business transaction by a user, transfer of funds from a user's account to a trader's account, management of electronic warehousing, initiation of the delivery of the goods and/or services purchased by the user, and other activities that can be achieved automatically once the information is available in electronic form. An alternative to transferring funds within the initiation of the business transaction is to reserve funds for transfer from the user to the trader on a timed basis, or in installments or upon acceptance of delivery of the goods and/or services by the user.

Accordingly, the present invention provides a system for automatically conducting a business transaction between a user and a trader including:

a trader terminal including billing information representative of said trader;

a user terminal, or user card associated with a user terminal;

a local communications link provided between said user terminal or said user card and said trader terminal;

wherein an order for goods and/or services of the trader is initiated by transmitting data over said link using a message protocol from said user terminal to be received by said trader terminal;

said user terminal, or said user card receiving and processing user information representative, of said user, and for receiving and processing said billing information via said link in response to said order; and     a communications network enabling said user terminal to communicate with a service provider, wherein said user terminal transmits said billing information and said user information to said service provider over said communications network, whereupon said service provider automatically transfers funds of said user to said trader under the authorization of said user to effect a financial transaction between said user and said trader.

The order may be automatically transmitted when said user terminal is within the proximity of said trader terminal.

The user terminal or user card may receive said billing information through said local communication's link when said user terminal or said user card is in the vicinity of said trader terminal or is linked to said trader terminal.

Reserve funds of said user may be made available to transfer to said trader either partially or in full for goods and/or services purchased by said user. The reserve funds may be transferred on the basis of the amount of use or length of use of the goods and/or services.

The service provider may transmit a message to said trader terminal indicating the completion of all or part of the financial transaction.

The user terminal may transmit delivery point information associated with goods and/or services purchased by the user through the business transaction to the service provider together with said billing information and said user information.

The user information may be pre-stored on said user card or integrated into said user terminal. The user card may be adapted to be inserted into said user terminal. The delivery point information may be pre-stored on said user card, integrated into the user terminal, or added by the user by means of a keyboard/keypad on request by an indicator on said user terminal.

The user terminal may include a communications terminal adapted to interact with the trader terminal through data acquisition means such as detector means, of said user terminal for sensing the trader billing information and a computing processor integrated with the communications terminal.

The user may authorise a transaction by entry of a PIN on the user terminal.

On completion of the transfer of funds from the user to the trader, information identifying the goods and/or services of the trader purchased by the user and said delivery point information may be automatically transferred to an electronic warehouse, or the like, to allocate the goods and/or services. Alternatively, the reserve funds of said user may be transferred to said trader upon acceptance by said user of delivery of said goods and/or services.

After allocation of the goods and/or services has taken place, delivery of the goods and/or services may be initiated, on the basis of said delivery point information. Where implemented, reserve funds of said user may be transferred to said trader upon delivery or acceptance by said user of the goods and/or services.

The present invention also provides for a method of automatically conducting a business transaction between a user and a trader, said method comprising the steps
- providing a local communications link between a user terminal and a trader terminal;
- transmitting over said link an order by said user for goods and/or services of said trader using said user terminal;
- receiving said order at said trader terminal;
  - wherein said order is transmitted and received using a messaging protocol;
- receiving by said user terminal, or by a user card associated with a user terminal, trader billing information representative of said trader from said trader terminal via said link;
- processing on said user terminal or said user card said trader billing information and user information representative of said user,
- transmitting said trader billing information and said user information to a service provider over a communications network, and
- automatically transferring funds of said user to said trader via the service provider under the authorization of said user to effect a financial transaction between said user and said trader.

The step of transmitting an order may include automatically transmitting said order when said user terminal is within the proximity of said trader terminal.

The receiving by said user terminal step may include receiving said trader billing information through said local communications link when said user terminal or said user card is in the vicinity of said trader terminal or is linked to said trader terminal.

The step of automatically transferring funds may include transferring reserve funds either partially or in full for goods and/or services purchased by the user. The reserve funds may be transferred on the basis of amount of use or length of use of the goods and/or services or upon delivery or acceptance by the user of the goods and/or services.

The method may further include the step of transmitting delivery point information associated with goods and/or services purchased by the user through the business transaction to the service provider together with said trader billing information and said user information.

The method may further include the step of automatically transmitting a message to the trader terminal indicating completion of all or part of the financial transaction to the trader.

The method may further include the step of automatically transmitting information identifying the goods or services of the trader purchased by the user and the delivery point information to an electronic warehouse, or the like, so as to allocate the goods or services.

The method may include a further step of initiating delivery of the goods or services on the basis of said delivery point information.

Preferably, the user authorises the financial transaction by entry of a PIN on the user terminal.

A preferred embodiment of the invention is hereinafter described, by way of example only, with reference to the accompanying drawings wherein:

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
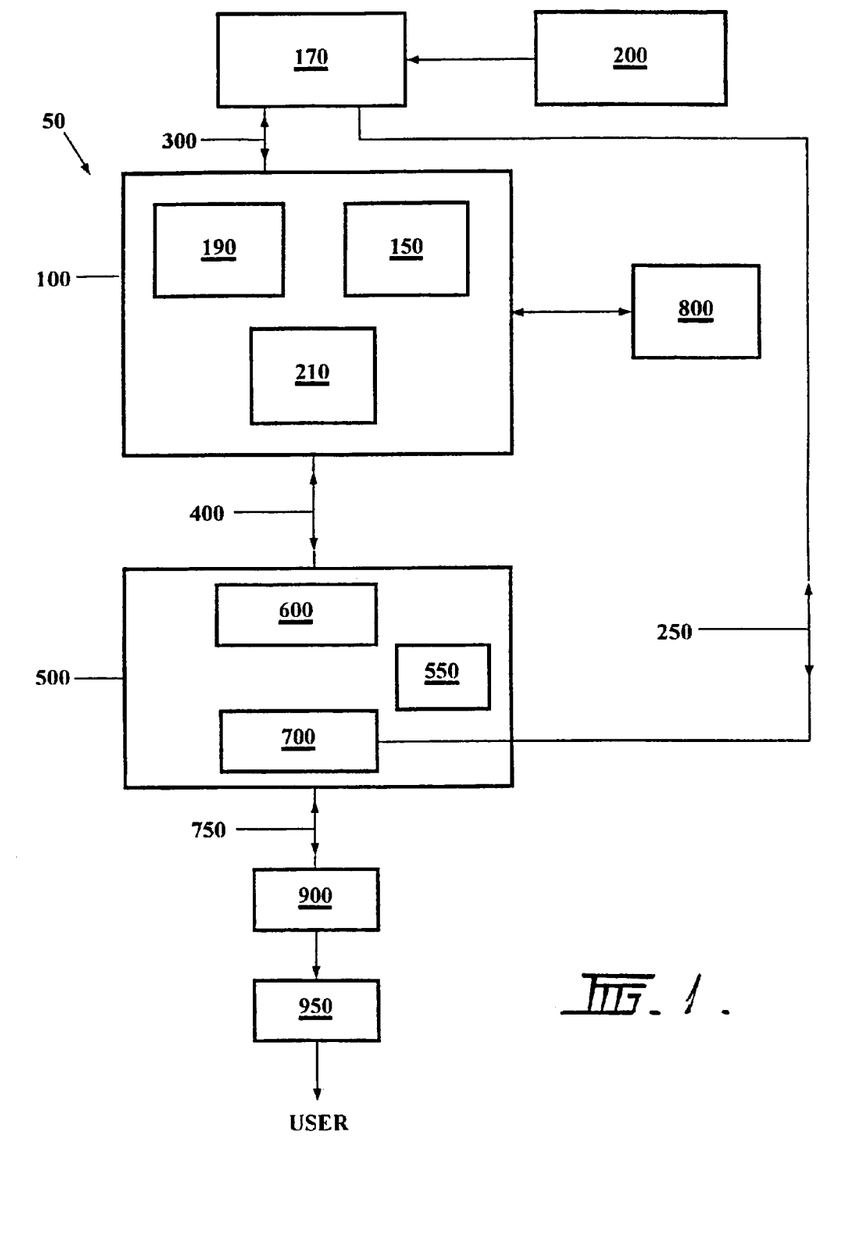
FIG. 1 shows a system for automatically conducting a business transaction between a user and a trader in accordance with the present invention.

FIG. 1 shows a system 50 that comprises a user terminal 100 in communication with a trader terminal 170 through local communication link 300. The trader's billing information 200, which can include charging information, is stored at the trader terminal 170. To implement a business transaction on a user's behalf, the user enters a command or order for goods and/or services of a trader on the user terminal 100 or alternatively the user terminal 100 senses the presence of the trader terminal 170 requesting a demand for payment for goods and/or services by the trader terminal 170 over the link 300 through the trader billing information 200. The information identifying a trader, contained in billing information 200, and into which account of the trader 700 funds will be transferred, is transmitted to the user terminal 100 over link 300. The user terminal 100 then retrieves information identifying the user's account 600 from which funds will be withdrawn, and forwards both sets of information, that is user information and trader billing information, to a service provider 500 over the communications network 400 whereby funds are transferred from the user account 600 to the trader account 700. The transfer of funds is approved by the user on entry of a PIN on the user terminal 100. The user terminal 100 may be used to add other information, such as delivery point information specifying the point of delivery for the goods and/or services purchased from the trader by the user. Confirmation of an order for goods and/or services by a user may be performed by entry of a key, code or PIN on the user terminal 100, not being the PIN associated with the approval of transfer of funds.

The delivery point information is then transmitted over communications network 400 to the service provider 500. On completion of the financial transaction, the delivery point information and approval for delivery is then transmitted by service provider 500 to an electronic warehouse 900, or the like, over communications link 750. Information from the trader terminal 170, specifying the goods and/or services purchased by the user is forwarded at any time during the process to the electronic warehouse 900 which then reads that information to allocate or obtain the goods or services ready for delivery to the user at 950.

Funds of a customer may be reserved for payment to a trader so that the transfer of funds need not take place immediately following the completion of the transaction. Funds may be transferred from the user account 600 to the trader account 700 progressively with time or upon the completion of an event, for example, when goods and/or services of the trader are available following an order for the same by the user. The funds could be transferred partially, by way of installments, or fully. Each installment may be under the control of the trader billing information 200. For example a trader may allow a user to trial the goods and/or services for a specified period of time or for an amount of usage prior to the transfer of funds. The transfer of funds may only take place when the user accepts the goods and/or services or upon completion of delivery to the user. The level of use and therefore the amount of funds transferred is controlled and established by a charging and billing system 200 operated by the trader.

Upon delivery of the goods or services, confirmation messages of such delivery is transmitted from electronic warehouse 900 to the user terminal 100 and the trader terminal 170, together with any other notes or other control matters as are deemed appropriate, including confirmation and/or activation of previously reserved activities. The transfer or release of customer funds may take place after such confirmation messages are received and/or acknowledged by the user. After confirmation and delivery, the initiation of data activities, which allows quality management of the transaction and business and the provision of responses to user enquiries, takes place.

Where funds have been transferred, either partially or fully, from a user to a trader the system 50 may be used to reverse a transaction. This action will be under the control of the trader and may be initiated in response to certain criteria, for example quality control of the goods and/or services sold by the trader. The service provider 500 has a database 550 which stores information on each transaction conducted for each trader. Such information may include delivery dates and times, accounting details, where the goods came from and delivered to, etc. Each transaction is identified by a unique code and access can only be permitted to a trader or the service provider 500. Where a refund, either full or partial, has been determined by the trader responsible for a sale, the trader accesses the database 550 through a communications network connecting the trader to the service provider 500, such as by link 250, which may be the Internet or PSTN, recovers the details pertaining to the particular transaction, and permits the service provider to debit the trader account 700 and credit the user account 600 with the nominated amount of money. All of the messaging and input required may take place at the trader terminal 170, on a computer console for example.

Taxes and imposts may be payable on certain goods and/or services sold by a trader. These may be enforced or legislated by a controlling body, such as a government, and the level of such legislated taxes and imposts determined by such a body or analysis of the business cycle. For the funds transfer process described above, including transfer of reserved funds, the amount of tax or impost will be levied against the user and transferred by the service provider 500 to the controlling body. The percentage or dollar amount due on each goods and/or services is contained within the billing information 200 of the trader and automatically debited from user account 600 to a nominated account of the controlling body.

In the event of a refund being owed to a user, a reverse transaction will occur as previously described and, to the extent permitted by legislation, a reverse transfer of the amount of tax or impost will take place such that the nominated account of the controlling body is debited for that amount and the user account 600 is credited with the same amount.

The user terminal 100 may be a remote wired or unwired access terminal consisting of a communications terminal such as a telephone and more particularly, a mobile telephone having data keys and a display screen or other display facility. A computing processor may be integrated into the communications terminal, or may be incorporated in a user card 800, the user card 800 being adapted to fit into the communications terminal. Optionally the user terminal 100 can include a card reader 150, being a mobile EFTPOS device, for reading data from the user card 800. The communications terminal may be a fixed terminal or cellular terminal that includes a data interface 210, all of which is compatible with communications network 400.

The user terminal 100 is described as a mobile telephone having a keypad and display etc, however this is only one example of what the user terminal 100 may comprise. The user terminal 100 may incorporate any form of communication terminal which is part of a public switched fixed network or mobile communications network, or a fixed circuit established for the purpose of processing and transmitting the required information, for example, a PC. It may be a circuit provided as part of a cable or other linked service, such as a television control system, allowing two-way data communications between the user terminal 100 and user account 600. In turn, the user's account communicates and co-operates with the trader account 700, and other elements of the financial transaction, either directly or indirectly, but as far as it is possible in near real time.

The trader billing information system 200 is a system satisfying all billing functions required by the trader and is located at a trader's facility or terminal. The billing information system 200 establishes a financial liability record in the service provider's accounting system for each user. It is capable of presenting transaction information in any form specified by the trader and shows details of transactions when these are implemented under the control of the trader, or the user, or the service provider to be discussed later.

The resultant billing information is an output at the trader terminal 170 at the point of operation by the user. The user terminal 100 may read the trader's details or information identifying a trader through a trader's card located at the trader terminal or read it through the local link 300 remotely from the trader terminal.

The user terminal 100 may incorporate a data acquisition system 190, such as an infra-red detector, for detecting a trader's billing information and a trader's destination account information from the trader terminal 170 for which funds are to be transferred into. The detector is activated by the trader terminal 170 through the communications local link 300 and this information is then read and stored by the user terminal 100. Alternatively, the card reader of the user terminal 100 can read the trader's card at the trader terminal 170 and retrieve the billing system information and trader account details. The data acquisition system 190 may alternatively be an ultrasonic detector, radio frequency detector or magneto-inductive detector depending on the communications used in the local link 300.

The communications link 300 is the means by which the user's telephone of the user terminal 100 is provided with the identity of the trader, the identity of the trader's banking account to which payment is effected and sufficient data related to the trader's billing system to include the dollar amount of the goods and/or services and what the goods and/or services relate to, together with other information which may be necessary for the conduct of the transaction such as ordering of the goods and/or services. The local link 300 is duplex in that it allow two-way communication on different channels. On one channel the trader's data will be transmitted to the user's phone and the reverse channel is used for confirmation to the trader that a transaction has been completed and for other handshaking protocols including the ordering of the goods and/or services concerned. The duplex communications link may be any one of several types of link including, but not limited to, modulated infra-red, magneto-inductive loop, modulated ultrasonic and radio frequency in each direction, or in any combination. The detector 190 located in the user terminal 100 will accordingly be of a type corresponding to the data transmission type and methodology used on the local link 300.

Once the trader's details have been received by the user terminal 100, details of the user's account from which funds will be withdrawn are read from the card 800 of the user by the card reader 150. Information detailing the delivery point of the goods or services purchased may be entered by the user through terminal 100 for transmission to the service provider 500.

The user's phone subsequently calls or dials automatically the service provider 500, such as a banking system, over the communications network 400 whereby a conventional EFTPOS link is established. The service provider 500 has access to each of the user's account 600 and the trader's account 700. The user is informed of the processes being conducted by data appearing on the display facility of the telephone. When the user is satisfied that the correct details of the transaction e.g. that trader information, transaction amount and accounts details have been entered and processed, the user enters a PIN to authorise a processing of the transaction. A message is then displayed to indicate to the user that the transaction is complete, and a signal is also sent via links 400 and 300 to the trader's terminal and/or through link 750 to electronic warehouse (goods/services delivery system) 900 to indicate the completion of the financial transaction and to initiate the delivery process. Link 250 may be used by the trader to verify a transaction or to access particular details of accounts.

The communications network 400 may be a publicly available fixed network, such as the PSTN, for wide applications or a cellular network for terrestrially based communications for fixed geographic areas, or the Internet, or it may be a satellite based network for global communications. The network may also incorporate basic or higher ISDN protocols.

The technology provided throughout the communications network 400 permits duplex data transmission at a data rate sufficient to limit the processing time associated with a transaction to a short period, e.g. 5 seconds, which is a time commensurate with "near real time" from a user's perspective.

The service provider 500 may be a banking system conventionally interconnected with and part of the automatic teller machine (ATM) services provided in wired systems. Therefore, all of the services available through ATMs may be equally available at the remote user terminal/trader terminal or facility. The service provider can manage an accounting system on behalf of a trader and generate demands for payment using a billing system of the trader. In this situation, the billing system will be integrated with the banking system insofar as transactions are traceable. The user terminal must be able to access a service provider system to the level necessary to determine the financial liability of the user and the location and identity of the destination account i.e. of the trader.

The card 800, adapted to be inserted into the mobile telephone of the user terminal 100, has a built in computing processor, the card being unique to each user. Alternatively, a hardwired equivalent of card 800 can be integrated into terminal 100. The computing processor of the card, or hardwired equivalent, provides sufficient data processing to accept a trader's billing and identification data from trader terminal 170. The card incorporates a sensor of the type previously described, in relation to the mobile phone, to sense the trader's data. The card combines this data with the user's funds source data, read by card reader 150, and transmits these to the service provider 500 over communications network 400, using protocols well established for a mobile EFTPOS device.

Irrespective of the physical form of the card 800, or hardwired equivalent, and the user terminal 100 may incorporate some or all of the following protocols:

(a) A user access protocol. In this operational mode, the card 800, or its equivalent, will enable, in conjunction with relevant security devices, keypad access. The keypad of the telephone may be used or the keypad may be incorporated in the card interface reader. In its basic form, the card incorporates a magnetic strip or other recording mechanism which provides identification and data checking only. The operating processes will be conducted by the service provider at its central processing sites, whilst the user terminal processes will provide data management and conversion protocols. This user access protocol satisfies both credit and debit type accounts.

(b) A stored-value protocol. In this mode, the card 800 is preconditioned to store a financial value which is available for transaction purposes as either a pre-paid value or as a credit limit.

(c) A messaging protocol. Communications on the links 250, 300, 400, 750 and any other links which are also used to transfer information, do so in a message format. A standardized protocol allows all processing points 100, 170,

600, 700, 900 and all data terminals associated with links 250, 300, 400, 750 and other associated links, to minimize and/or add to the messages. That is, elements can be stripped and/or inserted from/in the total message so that the remainder of the message is not affected. The standardized protocol is likely to incorporate existing methods, extended where necessary to achieve the total functionality.

Communications link 300 between trader terminal 170 and user terminal 100 allows transfer of data in message from, in both directions, at a level of safety which is acceptable for the level of data and information involved, using any form of acceptable communication, but which as a minimum, does not restrict the form or volume of the message nor appear to the user as introducing an unacceptable delay on the process.

The card reader 150 of the user terminal 100 is integrated with the mobile telephone where the computing processor is part of the telephone. In this case, when the card is placed in the phone such that the card reader is able to start reading data from the card, it will automatically initiate the computing functions to process a transaction. The reader sends signals to the computing processor to establish the circuit on communications network 400 and completing the transaction upon entry of a PIN by the user using the telephone.

The card reader 150 and card 800, or its equivalent, can also form part of a stand-alone computing system such as a PC, generally of a portable "laptop" type or of the "Notebook" class, where the PC effectively replaces the mobile phone as the user terminal 100. The PC essentially acts as a computing processor and has incorporated into it a data interface to permit communication with the service provider 500 over communications network 400. Any one of several communications network systems are possible including public data networks and the Internet. Alternatively, the on-board processor of the card may perform the necessary data processing, such as the user account details and the trader account details, sensed at the point of sale of the trader at terminal 170. The card reader is integrated with a commercially common access port, such as a PC Card port or a Personal Computer Memory Card International Association (PCMCIA) Card port, to permit the necessary protocols for data transfer between the reader and the computing processor. The card indicates the source of where funds are to be withdrawn from the user's account. Specific entries may be made such as a PIN via the keyboard to the PC.

A The system 50 provides the following functions during the period that the user or trader is operating the user terminal 100, where the user terminal 100 is under the control of the trader:

(a) extracting the billing information 200 from the trader through link 300 with processing undertaken through the card 800 or by other means incorporated into the user terminal;

(b) debit a nominated financial account requested by the user. Such an account could be a debit, credit or stored-value account associated with the card;

(c) transfer funds from the nominated account to the trader's account so that these funds are available to the trader without further user or trader activity, or alternatively reserve funds within the nominated account for exclusive use by the trader upon delivery of goods and/or services or upon acceptance of the delivery of the goods and/or services by the user.

(d) accomplish any financial transaction between traders or other organisations for which the provider is an agent; and (e) requesting the user for delivery point information concerning the goods/services purchased, receiving the information and transferring that information to initiate delivery, and/or transferring other information relevant to the transaction, within the messaging system.

The user terminal 100 may alternatively be under the control of the trader, as mentioned before, that is, part of the trader's facility or terminal 170 in a co-operating system, in which case all the user information can be read from the same card 800. In this situation, the card 800 of the user will contain all the information relevant to the user, such as account type and identification, needed to perform a transaction. The card is read by the terminal, which already has the information relating to the trader, and these sets of data are transmitted to the service provider 500 over the communications network 400. This occurs after financial liability of the user has been established. In the manner previously described, the user enters the PIN on a terminal to authorise a transaction and funds are transferred by the service provider from the nominated user account to the trader's account or alternatively reserved for transfer from the user to the trader upon acceptance of delivery of the goods or services by the user. Typical applications would be where small payments are required such as for parking, public transport and vending machines. Goods or services may then be dispensed at the trader terminal for the user.

The user terminal may be under the control of the user i.e. the terminal being the mobile phone or PC of the user, as described hereinbefore, where the link 300 is used to access the trader's identification and account data.

The user terminal may alternatively be under the control of the service provider, as a service provided to the trader, at the point of operation of the trader which is also common to the user. In this situation, the card used by the user is the means by which the user's account is accessed.

The following are examples of how the system 50 can be applied:

The system 50 may be used as an entry into an area governed by the trader, entry being allowed under the control of the user by entry of a PIN on user terminal 100. Once the transaction is authorised, entry to the area is enabled.

Figure 2:
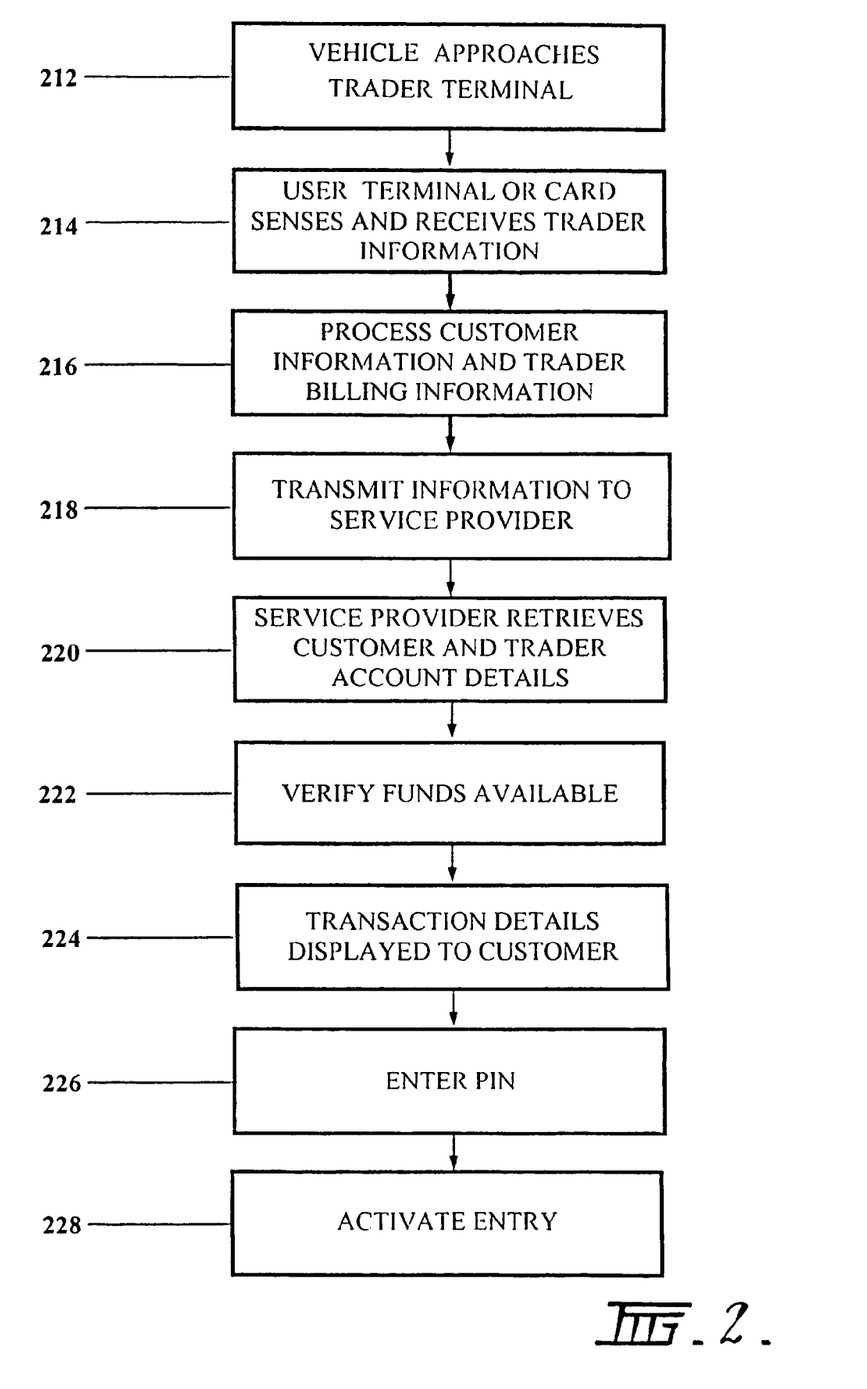
FIG. 2 shows processes involved according to a first embodiment of the system of FIG. 1.

For example, the system 50 may be incorporated into a tollway for a bridge crossing or traversing a motorway, owned by a government authority. With reference to FIG. 2, a vehicle approaches a trader terminal 170 near the entrance to the tollway at step 212. The trader terminal in this case may be an inductive loop fitted in the roadway. The trader terminal is coded with trader billing information including trader account details, trader identification and the amount of the toll. At step 212, once the user terminal 100, in the form of a mobile telephone, is within range of the trader terminal, the telephone receives the coded information through the detector 190 over the local communications link 300, the information being stored in the telephone. Alternatively, a card 800 adapted to fit in the telephone may receive the trader coded information. Computer processing means, either on the telephone or card 800, processes the received information and user information, such as the account and identification of the user at step 216. The fare for the tollway is then displayed on the display screen of the telephone. The trader billing information and user information, which user information may be stored integrally with the phone or on the card, is transmitted automatically to service provider 500 through interface 210 over network 400 at step 218, wherein the phone dials up the service provider 500. At step 220 the service provider 500 retrieves user account details 600 and trader account details 700. Messages are sent to the phone to inform the user of the processes taking place. The service provider verifies that there are enough funds in the user account to cover the fare at step 222. The transaction details are displayed to the user at step 224, the funds transfer is then enabled on entry of a PIN by the user at step 226, which is prompted by a message transmitted to the user terminal over the communications network 400. A signal is then sent over network 750 to the trader terminal to activate entry into the tollway automatically at step 228. The trader terminals may consist of a series of terminals along the path of the motorway where a sensing of each terminal is required to determine all the billing information to complete the transaction.

Alternatively, a trader's card, containing the billing information and located at each terminal, may be sensed by either detector 190 or card reader 150 of user terminal 100 at various points along the motorway etc. to complete the transaction.

Figure 3:
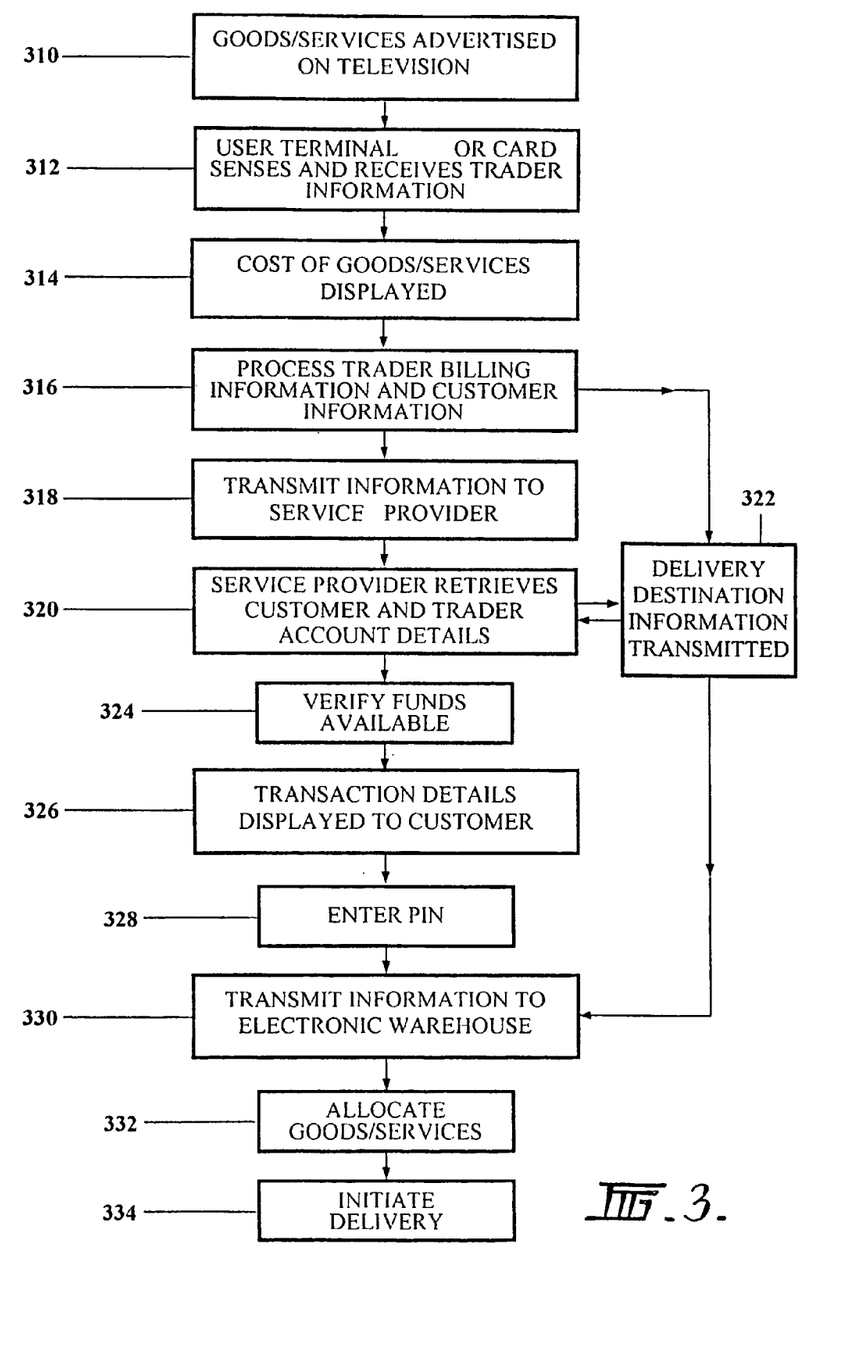
FIG. 3 shows processes involved according to a second embodiment of the system of FIG. 1.

A second example of how system 50 may be implemented is discussed with reference to FIG. 3. In a similar fashion to the previous example, goods or services of a trader may be advertised on a pay-television channel in an interactive pay-television application. The set-top unit (STU) associated with a user's subscription, or alternatively coded information appearing on the TV screen, may be used to provide the trader billing information including account and identification details.

In the case of the STU, various codes associated with each trader may be pre-programmed into the STU. A user terminal 100, akin to a remote control unit, has a detector 190 for sensing and receiving the trader billing information. When a user wishes to purchase goods or services advertised at step 310, the user terminal 100 is directed to sense the information from the trader over a local link 300 at step 312 and the trader billing information is stored in the user terminal 100, where user information is also stored. The cost of the product is displayed on terminal 100 or on the user's television screen at step 314. The user may use the user terminal 100 to order goods and/or services from the trader and confirm such order by entering a code or PIN on the user terminal 100, this code or PIN not being the PIN associated with authorising the transfer of funds from the user account to the trader account. Funds may then be transferred at a later time. At step 316, the information relating to trader billing and to the user is processed and then at step 318 transmitted through an interface 210 on the terminal 100, over link 400 to a service provider 500. Alternatively, a user card 800 may store and process the trader information and user information, have it read by card reader 150 and subsequently automatically transmitted to the service provider. At step 320, the service provider 500 retrieves the trader account details 700 and user account details 600. At step 324 the service provider 500 verifies that the user account has enough funds to cover the transaction, then at step 326 the transaction details are displayed for the user to authorise the transaction by entry of a PIN at step 328. The funds are then transferred or alternatively reserved for transfer from the user to the trader upon acceptance of delivery of the goods and/or services by the user, and delivery destination information can be transmitted, e.g. home, workplace, at step 322 to the service provider and subsequently transmitted to electronic warehouse 900 over link 750 together with information identifying the goods and/or services purchased by the user at step 330. The goods, identified by the code, are then allocated by the warehouse at step 332 ready for delivery to the user at step 334. A telephone channel or other co-operating communications link that the pay-TV system uses may also be used as the reverse channel for confirmation to the trader of the transaction being completed, and within the funds reservation alternative, effect transfer of funds from the user to the trader.

Figure 4:
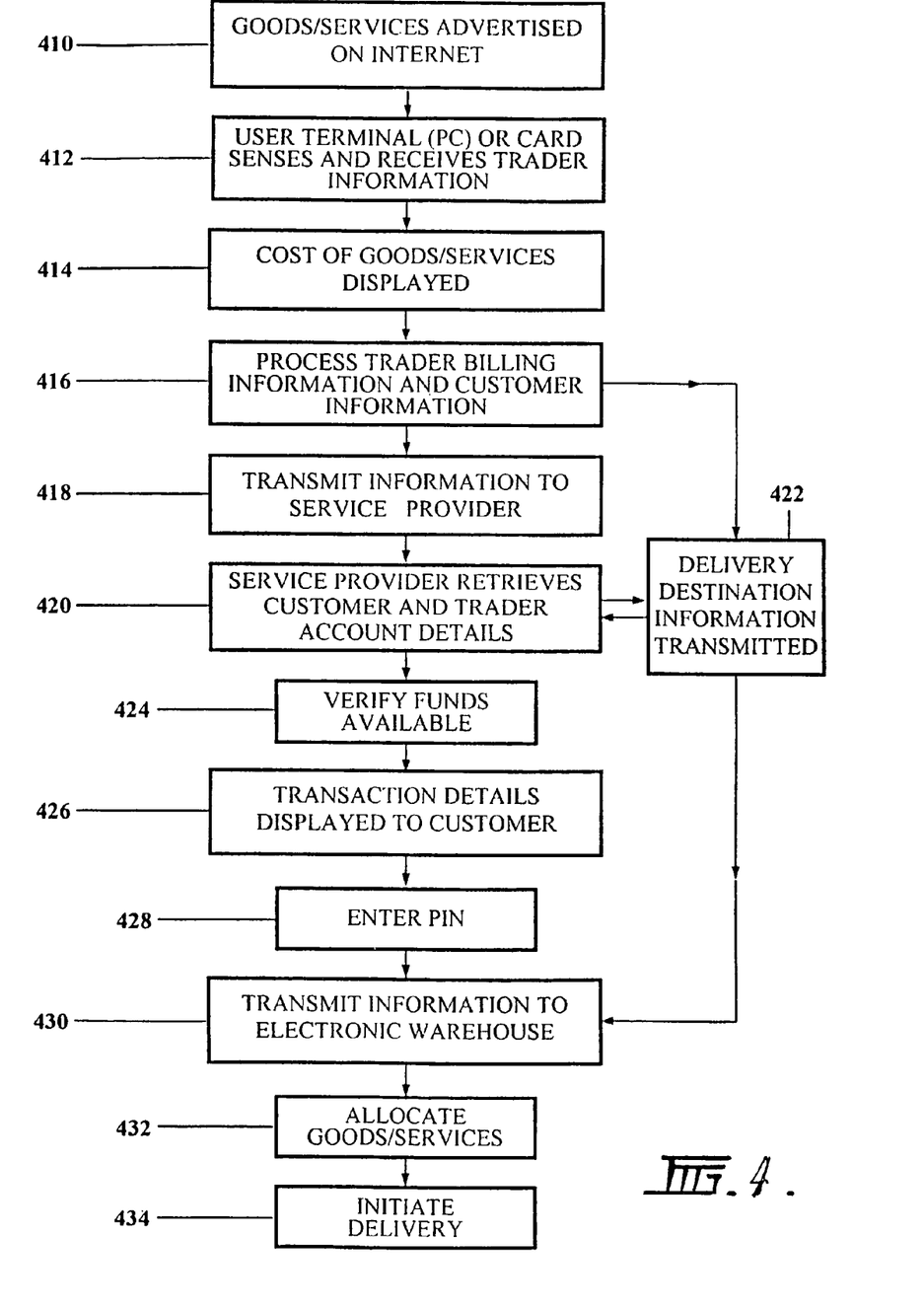
FIG. 4 shows processes involved according to a third embodiment of the system of FIG. 1.

A third example of how the system 50 may be implemented is discussed with reference to FIG. 4. The system 50 may be a terminal connected to the Internet through a normal Internet connection. In this case, the link 400 and the messaging protocol are emulated by, and integrated into, the Internet service as a software facility connected to the service provider 500 and the warehouse and delivery systems 900, 950.

Goods or services may be advertised on the Internet and viewed by a user on a monitor associated with a PC at step 410. The PC in this case acts as a user terminal 100 fitted with a detector 190 and optionally may have a user card 800 having on-board processing means to process the trader billing information and user information details. The goods or services advertised may be identified by coded information as well as the trader billing information.

When a user wishes to purchase a product, the coded information is sensed and detected by the specially adapted PC over communications link 300 at step 412, the information then being downloaded and stored in the PC. Alternatively, a mouse associated with the PC may be used to point a cursor to selections on screen. The cost of the goods and/or services are displayed on the monitor for the user at step 414. Both sets of data from the trader and from the user are subsequently processed at step 416 and transmitted to the service provider at step 418 through interface 210 wherein the PC dials the service provider 500 over the communications network 400. Alternatively at step 418, a message containing the relevant transaction information is transmitted by the PC to the Internet address of the service provider 500, the Internet providing the communications network 400. As with the previous example the service provider 500 accesses the user account 600 and trader account 700 details at step 420, available funds are verified at step 424 and the transaction details displayed to the user on the monitor at step 426. If the user is satisfied that the details are correct, and sufficient funds are available, the user enters a PIN at step 428 to authorise the transfer of funds between accounts or alternatively reserves funds for transfer from the user to the trader upon acceptance of delivery of the goods and/or services by the user.

Delivery destination information may be input by the user at step 422, at this stage or when the user information was transmitted to the service provider. It is then forwarded on to the electronic warehouse 900 over network 750 at step 430 together with information identifying the good and/or services purchased by the user. At step 432 the warehouse then allocates the goods based on the trader coded information identifying those goods. After the goods have been allocated and retrieved ready for delivery, confirmation of the delivery is sent to the user on PC terminal 100 and to the trader. Thereafter, the goods are delivered to the nominated delivery point at step 434, including in the case of funds reservation, effecting the transfer of funds from the user to the trader upon completion of the delivery or acceptance thereof by the user.

The invention claimed is:

1. A system for automatically conducting a business transaction between a user and a trader including:
   a trader terminal including billing information representative of said trader;
   a user terminal;

a local communications link provided between said user terminal and said trader terminal;

wherein an order for goods and/or services of the trader is initiated by transmitting a data request for billing information over said link, using a message protocol, from said user terminal to be received by said trader terminal;

said user terminal receiving and processing user information representative of said user, and receiving and processing said billing information via said link in response to said request; and a communications network having links independent of the local communication link enabling said user terminal to communicate with a service provider;

wherein said user terminal transmits said billing information and said user information to said service provider as the order over said communications network, whereupon said service provider automatically facilitates transfers funds of said user to said trader under the authorization of said user to effect a financial transaction between said user and said trader and ordering of the goods and/or services.

2. A system according to claim 1 wherein said request is automatically transmitted when said user terminal is within transmission proximity of said trader terminal.

3. A system according to claim 1 wherein said user terminal receives said billing information from said trader terminal through said local communications link when said user terminal is in transmission vicinity of said trader terminal.

4. A system according to claim 1 wherein said user terminal receives said billing information from said trader terminal through said local communications link when said user terminal is linked to said trader terminal.

5. A system according to claim 1 wherein said financial transaction is authorised by said user upon entry of a PIN on said user terminal.

6. A system according to claim 1 wherein, prior to any transfer of funds, confirmation of said order is entered on said user terminal by said user.

7. A system according to claim 1 wherein funds of said user are reserved for transfer to said trader, the reserved funds being transferred either partially or in full according to certain criteria relating to goods and/or services purchased by said user.

8. A system according to claim 7 wherein said certain criteria includes any one of amount of use of said goods and/or services, duration of use of said goods and/or services.

9. A system according to claim 7 wherein the partial transfer of reserved funds are transferred in installments and the amount of each installment is controlled in accordance with said billing information.

10. A system according to claim 1 wherein delivery destination information for goods and/or services purchased by said user is transmitted to said service provider, together with said billing information and said user information.

11. A system according to claim 10 wherein information identifying said goods and/or services purchased by said user are transmitted, together with said delivery destination information, to an electronic warehouse.

12. A system according to claim 11 wherein said electronic warehouse allocates said goods and/or services on the basis of said information identifying said goods and/or services purchased by said user, and initiates delivery of said goods and/or services on the basis of said delivery destination information for collection by said user.

13. A system according to claim 12 wherein the transfer of funds, including reserved funds, of said user to said trader takes place upon completion of delivery, or acceptance by said user, of said goods and/or services.

14. A system according to claim 12 wherein confirmation messages of completion of all or part of the financial transaction are transmitted by said service provider and confirmation of delivery of goods and/or services is transmitted by said electronic warehouse, to said trader and said user.

15. A system according to claim 10 wherein said user terminal stores said delivery destination information, or said delivery destination information is input by said user when prompted by said user terminal.

16. A system according to claim 1 wherein said billing information is incorporated into a trader card which provides said billing information to said trader terminal.

17. A system according to claim 1 wherein said user terminal has data acquisition means for sensing and receiving said trader billing information at said trader terminal.

18. A system according to claim 1 wherein said user terminal stores said user information, said user information including user identification and an account of said user from which funds are transferred.

19. A system according to claim 18 wherein said user terminal has computing processor means for processing said billing information and said user information.

20. A system according to claim 1 wherein said user terminal has interface means adapted to transmit any or all of said billing information, said user information, information identifying goods and/or services purchased by said user and delivery destination information to said service provider over said communications network.

21. A system according to claim 1 wherein said user terminal is adapted to receive a user card, said user card being unique to a particular user.

22. A system according to claim 21 wherein said user card pre-stores said user information, said user information including user identification and an account of said user from which funds are transferred.

23. A system according to claim 21 wherein said user card has data acquisition means incorporated therein for sensing and receiving said billing information at said trader terminal.

24. A system according to claim 21 wherein said user card has computing processor means for processing said billing information and said user information.

25. A system according to claim 21 wherein said user card pre-stores delivery destination information.

26. A system according to claim 24 wherein said user terminal has reader means for reading any one or all of said billing information, said user information and delivery destination information.

27. A system according to claim 1 wherein the user is informed, through the user terminal, of all processes being conducted in respect of the business transaction.

28. A system according to claim 1, wherein said transaction is reversible such that a partial or full refund to the user from the trader for said goods and/or services takes place and is initiated by said trader on the basis of certain criteria, such as quality control.

29. A system according to claim 28 wherein said transaction is reversed by accessing a database of said service provider through a communications system operating between said trader and said service provider.

30. A system according to claim 29 wherein said database stores information relating to each transaction by an identification code.

31. A system according to claim 28 including goods and/or services having associated taxes/imposts applied by a legislative body, and in a reversible transaction, wherein the amount of taxes/imposts previously transferred to the legislative body is transferred to said user.

32. A system according to claim 1, wherein said trader has access to an account of said trader into which funds are transferred, through said service provider, so as to verify transaction details in said account of said trader.

33. A system according to claim 1 wherein said user terminal has access to an account of said user to verify that sufficient funds are available for said transaction.

34. A system according to claim 1, including goods and/or services having associated taxes/imposts applied by a legislative body, wherein the transfer of funds of said user includes said service provider transferring the associated amount of taxes/imposts to the legislative body.

35. A system according to claim 1, wherein a portion of the user terminal and said local communication link are incorporated in said trader terminal and said user information is incorporated in a user card associated with the user terminal.

36. The system according to claim 1, wherein the local communication link is automatically established between the user terminal and the trader terminal when the user terminal is in transmission vicinity of the trader terminal.

37. A method of automatically conducting a business transaction between a user and a trader, said method comprising the steps of:
providing a local communication link between a user terminal and a trader terminal;
transmitting over said link a request for billing information by said user for goods and/or services of said trader using said user terminal;
receiving said request at said trader terminal;
wherein said request is transmitted and received using a messaging protocol;
receiving by said user terminal, trader billing information representative of said trader from said trader terminal via said link,
processing on said user terminal said trader billing information and user information representative of said user,
transmitting said trader billing information as an order for goods and/or services and said user information to a service provider over a communications network independent of the local communication link, and
automatically facilitating transferring funds of said user to said trader via said service provider under the authorization of said user to effect a financial transaction between said user and said trader.

38. A method according to claim 37 wherein the step of transmitting a request includes automatically transmitting said request when said user terminal is within transmission proximity of said trader terminal and ordering said goods and/or services.

39. A method according to claim 37 wherein the receiving step includes receiving said trader billing information through said local communications link when said user terminal is in transmission vicinity of said trader terminal.

40. A method according to claim 37 wherein the receiving step includes receiving said trader billing information through said local communications link when said user terminal is linked to said trader terminal.

41. A method according to claim 37 wherein said financial transaction is authorised by said user upon entry of a PIN on said user terminal.

42. A method according to claim 37 wherein prior to said transferring step, the method includes the step of the user confirming said order using said user terminal.

43. A method according to claim 37 wherein the step of transferring funds includes transferring reserve funds of said user, said reserve funds being transferred either partially or in full according to certain criteria relating to goods and/or services purchased by said user.

44. A method according to claim 37 further including the step of transmitting delivery destination information for goods and/or services purchased by said user to said service provider, together with said trader billing information and said user information.

45. A method according to claim 44 further including the steps of transmitting confirmation messages to said trader and said user of delivery of said goods and/or services.

46. A method according to claim 37 further including the step of transmitting information identifying said goods and/or services purchased by said user and transmitting said delivery destination information to an electronic warehouse, or the like.

47. A method according to claim 46 further including the step of allocating said goods and/or services on the basis of said information identifying said goods and/or services purchased by said user, and initiating delivery of said goods and/or services on the basis of said delivery destination information for collection by said user.

48. A method according to claim 47 wherein the step of transferring funds, including reserve funds, follows the completion of delivery or acceptance by said user of said goods and/or services.

49. A method according to claim 37 wherein the step of receiving is performed by data acquisition means which is either integrated into said user terminal or integrated in a user card, said user card adapted to be inserted into and received by said user terminal.

50. A method according to claim 49 further including the step of reading, through reader means, any one or all of said trader billing information, said user information and delivery destination information.

51. A method according to claim 37 wherein the step of processing is carried out by said user terminal or a user card, the user card having computing processor means for carrying out said processing.

52. A method according to claim 37 further including the step of informing, through said user terminal, said user of all processes being conducted in respect of said business transaction.

53. A method according to claim 37 including the step of reversing said business transaction in the event that goods and/or services purchased by said user fail to meet certain criteria, said reversing of said transaction being initiated by said trader and including a partial or full refund to said user.

54. A method according to claim 53 and where said goods and/or services have associated taxes/imposts applied by a legislative body, the step of transferring funds of said user including transferring to said legislative body a partial or full amount of said taxes/imposts.

55. A method according to claim 53 and where said goods and/or services have associated taxes/imposts applied by a legislative body and a dollar amount equivalent to said taxes/imposts has been transferred to said legislative body, in a reversible transaction further including the step of transferring a partial or full amount of said dollar amount to said user.

56. A method according to claim 37 further including the steps of transmitting confirmation messages of completion of all or part of said financial transaction to said trader and said user.

57. A method according to claim 37 further including the steps of allowing said trader access to an account of said trader, through said service provider, so as to verify transaction details in said account of said trader.

58. The method according to claim 37, wherein the local communication link is automatically established between the user terminal and the trader terminal when the user terminal is in transmission vicinity of the trader terminal.

* * * * *